US011978417B1

(12) United States Patent
Huang et al.

(10) Patent No.: US 11,978,417 B1

(45) Date of Patent: May 7, 2024

(54) PIXEL ARRAY SUBSTRATE

(71) Applicant: AUO Corporation, Hsinchu (TW)

(72) Inventors: Shiuan-Hua Huang, Hsinchu (TW); Lin-Chieh Wei, Hsinchu (TW); Chun-Min Wang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/340,904

(22) Filed: Jun. 26, 2023

(30) Foreign Application Priority Data

Jan. 30, 2023 (TW) ................................ 112102964

(51) Int. Cl.
*G09G 3/36* (2006.01)

(52) U.S. Cl.
CPC ... *G09G 3/3614* (2013.01); *G09G 2300/0426* (2013.01); *G09G 2320/0209* (2013.01)

(58) Field of Classification Search
CPC ......... G09G 3/3614; G09G 2300/0426; G09G 2320/0209
See application file for complete search history.

(56) References Cited

U.S. PATENT DOCUMENTS

| | | | | |
|---|---|---|---|---|
| 8,179,350 B2 | | 5/2012 | Park et al. | |
| 8,502,948 B2 | | 8/2013 | Su et al. | |
| 8,724,067 B2 | | 5/2014 | Su et al. | |
| 11,551,627 B2 | * | 1/2023 | Zhao | G09G 3/3614 |
| 2006/0120160 A1 | * | 6/2006 | Park | G09G 3/3648 365/185.22 |
| 2011/0285950 A1 | * | 11/2011 | Su | G09G 3/3648 349/139 |
| 2013/0293821 A1 | | 11/2013 | Su et al. | |
| 2024/0038191 A1 | * | 2/2024 | Kim | G09G 3/3614 |

FOREIGN PATENT DOCUMENTS

| | | |
|---|---|---|
| TW | I387800 | 3/2013 |
| TW | I401517 | 7/2013 |

* cited by examiner

*Primary Examiner* — Amit Chatly
(74) *Attorney, Agent, or Firm* — JCIPRNET

(57) ABSTRACT

A pixel array substrate includes multiple data lines, multiple scan lines and multiple pixel structures. The scan lines include an m-th scan line and an (m+1)-th scan line arranged in sequence, and m is a positive integer. The pixel structures include first to twenty-fourth pixel structures. A control terminal of a transistor of the seventh pixel structure and a control terminal of a transistor of the eighth pixel structure are electrically connected to the (m+1)-th scan line and the m-th scan line respectively. A control terminal of a transistor of the thirteenth pixel structure and a control terminal of a transistor of the fourteenth pixel structure are electrically connected to the (m+1)-th scan line and the m-th scan line respectively.

3 Claims, 3 Drawing Sheets

PIXEL ARRAY SUBSTRATE

CROSS-REFERENCE TO RELATED APPLICATION

This application claims the priority benefit of Taiwan application serial no. 112102964, filed on Jan. 30, 2023. The entirety of the above-mentioned patent application is hereby incorporated by reference herein and made a part of this specification.

BACKGROUND

Technical Field

The disclosure relates to a pixel array substrate.

Description of Related Art

A liquid crystal display device is a type of flat panel display widely used at present. The working principle of the liquid crystal display device is to change the alignment state of the liquid crystal molecules in the liquid crystal layer by changing the voltage difference between the two ends of the liquid crystal layer to change the light transmittance of the liquid crystal layer, and then cooperate with the light source provided by the backlight module to display images. Generally speaking, the polarity of the voltage applied across the liquid crystal layer must be reversed at regular intervals to avoid permanent damage caused by polarization of the liquid crystal material and also avoid image sticking. Therefore, various driving modes of liquid crystal display devices have been developed: frame inversion, column inversion, row inversion and dot inversion. However, when some liquid crystal display devices driven in the column inversion mode display special patterns (for example, common in Excel tables including two consecutive dark pixel areas and two bright pixel areas), due to the coupling effect of the common electrode, a cross talk phenomenon will occur, which is currently difficult to be adjusted to disappear in the way of compensation.

SUMMARY

The disclosure provides a pixel array substrate, which can improve the problem of cross talk.

The pixel array substrate of the disclosure includes multiple data lines, multiple scan lines and multiple pixel structures. The data lines are arranged in a first direction. The scan lines are arranged in a second direction. The first direction intersects with the second direction. Each of the pixel structures includes a transistor and a pixel electrode, the transistor has a first terminal, a second terminal and a control terminal, the first terminal of the transistor is electrically connected to one of the data lines, the control terminal of the transistor is electrically connected to one of the scan lines and the second terminal of the transistor is electrically connected to the pixel electrode. The data lines include an n-th data line, an (n+1)-th data line, an (n+2)-th data line, an (n+3)-th data line, an (n+4)-th data line, an (n+5)-th data line, an (n+6)-th data line, an (n+7)-th data line, an (n+8)-th data line, an (n+9)-th data line, an (n+10)-th data line, an (n+11)-th data line and an (n+12)-th data line arranged in sequence in the first direction, and n is a positive integer. The n-th data line, the (n+2)-th data line, the (n+4)-th data line, the (n+6)-th data line, the (n+8)-th data line, the (n+10)-th data line and the (n+12)-th data line have first polarity, the (n+1)-th data line, the (n+3)-th data line, the (n+5)-th data line, the (n+7)-th data line, the (n+9)-th data line and the (n+11)-th data line have second polarity, and the first polarity is opposite to the second polarity. The scan lines include an m-th scan line and an (m+1)-th scan line arranged in sequence in the second direction, and m is a positive integer. The pixel structures include a first pixel structure, a second pixel structure, a third pixel structure, a fourth pixel structure, a fifth pixel structure, a sixth pixel structure, a seventh pixel structure, an eighth pixel structure, a ninth pixel structure, a tenth pixel structure, an eleventh pixel structure, a twelfth pixel structure, a thirteenth pixel structure, a fourteenth pixel structure, a fifteenth pixel structure, a sixteenth pixel structure, a seventeenth pixel structure, an eighteenth pixel structure, a nineteenth pixel structure, a twentieth pixel structure, a twenty-first pixel structure, a twenty-second pixel structure, a twenty-third pixel structure and a twenty-fourth pixel structure. The pixel electrode of the first pixel structure, the pixel electrode of the second pixel structure, the pixel electrode of the third pixel structure, the pixel electrode of the fourth pixel structure, the pixel electrode of the fifth pixel structure, the pixel electrode of the sixth pixel structure, the pixel electrode of the seventh pixel structure, the pixel electrode of the eighth pixel structure, the pixel electrode of the ninth pixel structure, the pixel electrode of the tenth pixel structure, the pixel electrode of the eleventh pixel structure, the pixel electrode of the twelfth pixel structure, the pixel electrode of the thirteenth pixel structure, the pixel electrode of the fourteenth pixel structure, the pixel electrode of the fifteenth pixel structure, the pixel electrode of the sixteenth pixel structure, the pixel electrode of the seventeenth pixel structure, the pixel electrode of the eighteenth pixel structure, the pixel electrode of the nineteenth pixel structure, the pixel electrode of the twentieth pixel structure, the pixel electrode of the twenty-first pixel structure, the pixel electrode of the twenty-second pixel structure, the pixel electrode of the twenty-third pixel structure and the pixel electrode of the twenty-fourth pixel structure are arranged in sequence in the first direction. In a top view of the pixel array substrate, the first pixel structure, the second pixel structure, the third pixel structure, the fourth pixel structure, the fifth pixel structure, the sixth pixel structure, the seventh pixel structure, the eighth pixel structure, the ninth pixel structure, the tenth pixel structure, the eleventh pixel structure, the twelfth pixel structure, the thirteenth pixel structure, the fourteenth pixel structure, the fifteenth pixel structure, the sixteenth pixel structure, the seventeenth pixel structure, the eighteenth pixel structure, the nineteenth pixel structure, the twentieth pixel structure, the twenty-first pixel structure, the twenty-second pixel structure, the twenty-third pixel structure and the twenty-fourth pixel structure are located between the m-th scan line and the (m+1)-th scan line. In the top view of the pixel array substrate, the first pixel structure and the second pixel structure are located between the n-th data line and the (n+1)-th data line, the third pixel structure and the fourth pixel structure are located between the (n+1)-th data line and the (n+2)-th data line, the fifth pixel structure and the sixth pixel structure are located between the (n+2)-th data line and the (n+3)-th data line, the seventh pixel structure and the eighth pixel structure are located between the (n+3)-th data line and the (n+4)-th data line, the ninth pixel structure and the tenth pixel structure are located between the (n+4)-th data line and the (n+5)-th data line, the eleventh pixel structure and the twelfth pixel structure are located between the (n+5)-th data line and the (n+6)-th data line, the thirteenth pixel structure and the fourteenth pixel structure are located between the (n+6)-th data line and the (n+7)-th data line, the fifteenth pixel structure and the sixteenth pixel structure are located between the (n+7)-th data line and the (n+8)-th data line, the seventeenth pixel structure and the eighteenth pixel structure are located between the (n+8)-th data line and the (n+9)-th data line, the nineteenth pixel structure and the twentieth pixel structure are located between the (n+9)-th data line and the (n+10)-th data line, the twenty-first pixel structure and the twenty-second pixel structure are located between the (n+10)-th data line and the (n+11)-th data line and the twenty-third pixel structure and the twenty-fourth pixel structure are located between the (n+11)-th data line and the (n+12)-th data line. The control terminal of the transistor of the first pixel structure and the control terminal of the transistor of the second pixel structure are electrically connected to the m-th scan line and the (m+1)-th scan line respectively, and the first terminal of the transistor of the first pixel structure and the first terminal of the transistor of the second pixel structure are electrically connected to the (n+1)-th data line. The control terminal of the transistor of the third pixel structure and the control terminal of the transistor of the fourth pixel structure are electrically connected to the m-th scan line and the (m+1)-th scan line respectively, and the first terminal of the transistor of the third pixel structure and the first terminal of the transistor of the fourth pixel structure are electrically connected to the (n+2)-th data line. The control terminal of the transistor of the fifth pixel structure and the control terminal of the transistor of the sixth pixel structure are electrically connected to the (m+1)-th scan line and the m-th scan line respectively, and the first terminal of the transistor of the fifth pixel structure and the first terminal of the transistor of the sixth pixel structure are electrically connected to the (n+3)-th data line. The control terminal of the transistor of the seventh pixel structure and the control terminal of the transistor of the eighth pixel structure are electrically connected to the (m+1)-th scan line and the m-th scan line respectively, and the first terminal of the transistor of the seventh pixel structure and the first terminal of the transistor of the eighth pixel structure are electrically connected to the (n+4)-th data line. The control terminal of the transistor of the ninth pixel structure and the control terminal of the transistor of the tenth pixel structure are electrically connected to the m-th scan line and the (m+1)-th scan line respectively, and the first terminal of the transistor of the ninth pixel structure and the first terminal of the transistor of the tenth pixel structure are electrically connected to the (n+5)-th data line. The control terminal of the transistor of the eleventh pixel structure and the control terminal of the transistor of the twelfth pixel structure are electrically connected to the (m+1)-th scan line and the m-th scan line respectively, and the first terminal of the transistor of the eleventh pixel structure and the first terminal of the transistor of the twelfth pixel structure are electrically connected to the (n+6)-th data line. The control terminal of the transistor of the thirteenth pixel structure and the control terminal of the transistor of the fourteenth pixel structure are electrically connected to the (m+1)-th scan line and the m-th scan line respectively, and the first terminal of the transistor of the thirteenth pixel structure and the first terminal of the transistor of the fourteenth pixel structure are electrically connected to the (n+7)-th data line. The control terminal of the transistor of the fifteenth pixel structure and the control terminal of the transistor of the sixteenth pixel structure are electrically connected to the m-th scan line and the (m+1)-th scan line respectively, and the first terminal of the transistor of the fifteenth pixel structure and the first terminal of the transistor of the sixteenth pixel structure are electrically connected to the (n+8)-th data line. The control terminal of the transistor of the seventeenth pixel structure and the control terminal of the transistor of the eighteenth pixel structure are electrically connected to the (m+1)-th scan line and the m-th scan line respectively, and the first terminal of the transistor of the seventeenth pixel structure and the first terminal of the transistor of the eighteenth pixel structure are electrically connected to the (n+9)-th data line. The control terminal of the transistor of the nineteenth pixel structure and the control terminal of the transistor of the twentieth pixel structure are electrically connected to the m-th scan line and the (m+1)-th scan line respectively, and the first terminal of the transistor of the nineteenth pixel structure and the first terminal of the transistor of the twentieth pixel structure are electrically connected to the (n+10)-th data line. The control terminal of the transistor of the twenty-first pixel structure and the control terminal of the transistor of the twenty-second pixel structure are electrically connected to the m-th scan line and the (m+1)-th scan line respectively, and the first terminal of the transistor of the twenty-first pixel structure and the first terminal of the transistor of the twenty-second pixel structure are electrically connected to the (n+11)-th data line. The control terminal of the transistor of the twenty-third pixel structure and the control terminal of the transistor of the twenty-fourth pixel structure are electrically connected to the (m+1)-th scan line and the m-th scan line respectively, and the first terminal of the transistor of the twenty-third pixel structure and the first terminal of the transistor of the twenty-fourth pixel structure are electrically connected to the (n+12)-th data line.

DESCRIPTION OF THE EMBODIMENTS

Figure 1:
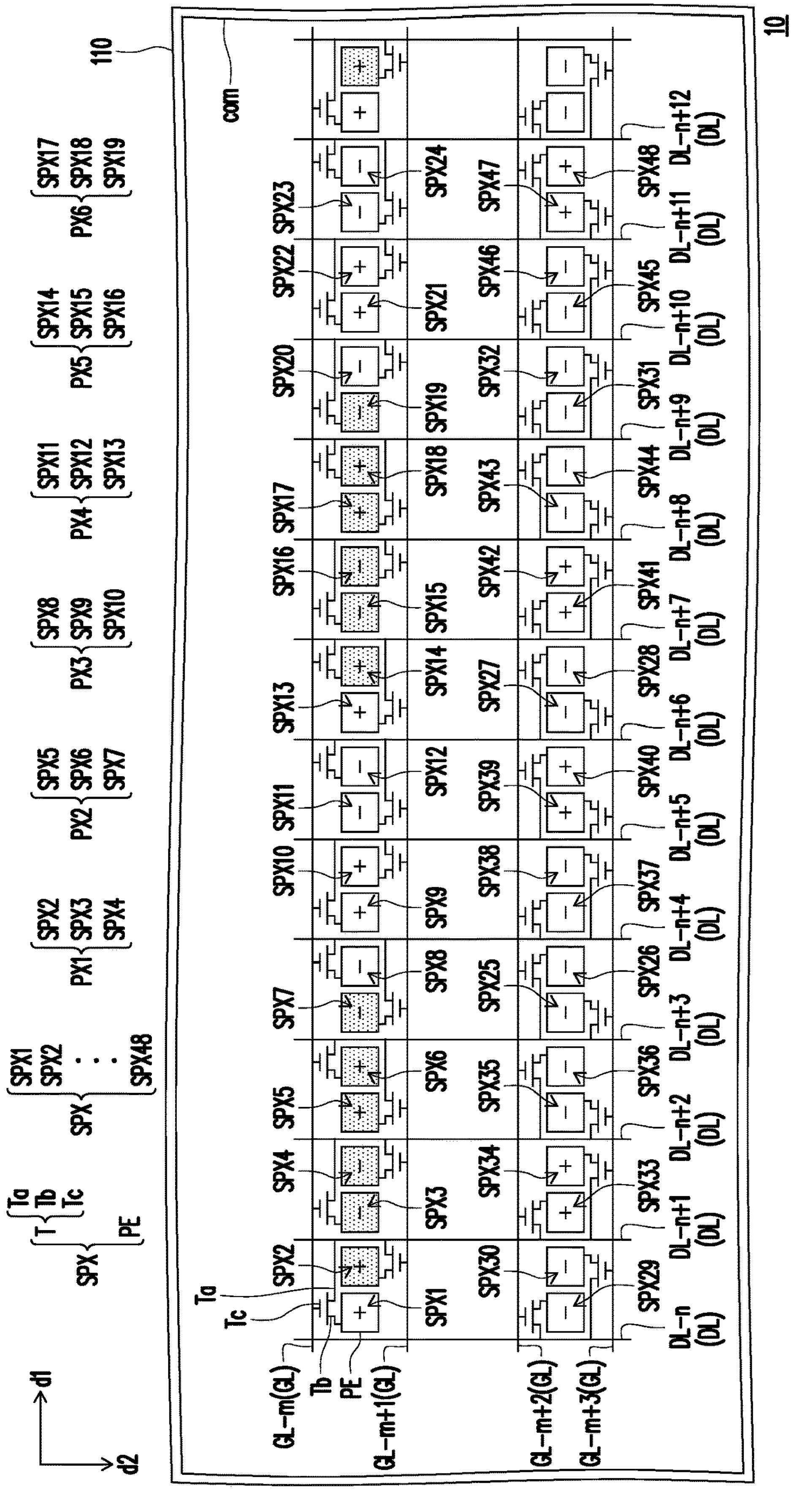
FIG. 1 is a schematic top view of a pixel array substrate according to an embodiment of the disclosure.

Reference is now made in detail to the exemplary embodiments of the disclosure, examples of which are illustrated in the accompanying drawings. If applicable, the same reference numerals in the drawings and the descriptions indicate the same or similar parts.

It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "electrically connected" or "coupled" may refer to the existence of other elements between two elements.

The usages of "approximately", "similar to", or "substantially" indicated throughout the specification include the indicated value and an average value having an acceptable deviation range, which is a certain value confirmed by people skilled in the art, and is a certain amount considered the discussed measurement and measurement-related deviation (that is, the limitation of measurement system). For example, "approximately" may indicate to be within one or more standard deviations of the indicated value, or within ±30%, ±20%, ±10%, or ±5%. Furthermore, the usages of "approximately", "similar to", or "substantially" indicated throughout the specification may refer to a more acceptable deviation scope or standard deviation depending on optical properties, etching properties, or other properties, and all properties may not be applied with one standard deviation.

Unless otherwise defined, all terms (including technical and scientific terms) used herein have the same meaning as commonly understood by those of ordinary skill in the field to which the disclosure pertains. It will be further understood that terms such as those defined in commonly used dictionaries should be interpreted to have meanings consistent with their meanings in the context of the relevant art and the disclosure, and will not be interpreted as idealized or excessive formal meanings, unless expressly so defined herein.

FIG. 1 is a schematic top view of a pixel array substrate according to an embodiment of the disclosure.

Referring to FIG. 1, a pixel array substrate 10 includes multiple data lines DL, multiple scan lines GL and multiple pixel structures SPX, which are disposed on a substrate 110. The data lines DL are arranged in a first direction d1. The scan lines GL are arranged in a second direction d2. The first direction d1 intersects with the second direction d2. For example, in the embodiment, the first direction d1 and the second direction d2 may be perpendicular, but the disclosure is not limited thereto.

Each of the pixel structures SPX includes a transistor T and a pixel electrode PE. The transistor T has a first terminal Ta, a second terminal Tb and a control terminal Tc. The first terminal Ta of the transistor T is electrically connected to a corresponding data line DL, the control terminal Tc of the transistor T is electrically connected to a corresponding scan line GL, and the second terminal Tb of the transistor T is electrically connected to the pixel electrode PE.

The data lines DL include an n-th data line DL-n, an (n+1)-th data line DL-n+1, an (n+2)-th data line DL-n+2, an (n+3)-th data line DL-n+3, an (n+4)-th data line DL-n+4, an (n+5)-th data line DL-n+5, an (n+6)-th data line DL-n+6, an (n+7)-th data line DL-n+7, an (n+8)-th data line DL-n+8, an (n+9)-th data line DL-n+9, an (n+10)-th data line DL-n+10, an (n+11)-th data line DL-n+11 and an (n+12)-th data line DL-n+12 arranged in sequence in the first direction d1, and n is a positive integer.

The n-th data line DL-n, the (n+2)-th data line DL-n+2, the (n+4)-th data line DL-n+4, the (n+6)-th data line DL-n+6, the (n+8)-th data line DL-n+8, the (n+10)-th data lines DL-n+10 and the (n+12)-th data line DL-n+12 have first polarity, the (n+1)-th data line DL-n+1, the (n+3)-th data line DL-n+3, the (n+5)-th data line DL-n+5, the (n+7)-th data line DL-n+7, the (n+9)-th data line DL-n+9 and the (n+11)-th data line DL-n+11 have second polarity, and the first polarity is opposite to the second polarity.

For example, in the embodiment, the first polarity is negative polarity, and the second polarity is positive polarity. That is to say, the n-th data line DL-n, the (n+2)-th data line DL-n+2, the (n+4)-th data line DL-n+4, the (n+6)-th data line DL-n+6, the (n+8)-th data line DL-n+8, the (n+10)-th data line DL-n+10 and the (n+12)-th data line DL-n+12 have negative polarity, and the (n+1)-th data line DL-n+1, the (n+3)-th data line DL-n+3, the (n+5)-th data line DL-n+5, the (n+7)-th data line DL-n+7, the (n+9)-th data line DL-n+9 and the (n+11)-th data line DL-n+11 have positive polarity, but the disclosure is not limited thereto.

The scan lines GL include an m-th scan line GL-m, an (m+1)-th scan line GL-m+1, an (m+2)-th scan line GL-m+2 and an (m+3)-th scan line GL-m+3 arranged in sequence in the second direction d2, and m is a positive integer.

The pixel structures SPX include a first pixel structure SPX1, a second pixel structure SPX2, a third pixel structure SPX3, a fourth pixel structure SPX4, a fifth pixel structure SPX5, a sixth pixel structure SPX6, a seventh pixel structure SPX7, an eighth pixel structure SPX8, a ninth pixel structure SPX9, a tenth pixel structure SPX10, an eleventh pixel structure SPX11, a twelfth pixel structure SPX12, a thirteenth pixel structure SPX13, a fourteenth pixel structure SPX14, a fifteenth pixel structure SPX15, a sixteenth pixel structure SPX16, a seventeenth pixel structure SPX17, an eighteenth pixel structure SPX18, a nineteenth pixel structure SPX19, a twentieth pixel structure SPX20, a twenty-first pixel structure SPX21, a twenty-second pixel structure SPX22, a twenty-third pixel structure SPX23, and a twenty-fourth pixel structure SPX24. The pixel electrode PE of the first pixel structure SPX1, the pixel electrode PE of the second pixel structure SPX2, the pixel electrode PE of the third pixel structure SPX3, the pixel electrode PE of the fourth pixel structure SPX4, the pixel electrode PE of the fifth pixel structure SPX5, the pixel electrode PE of the sixth pixel structure SPX6, the pixel electrode PE of the seventh pixel structure SPX7, the pixel electrode PE of the eighth pixel structure SPX8, the pixel electrode PE of the ninth pixel structure SPX9, the pixel electrode PE of the tenth pixel structure SPX10, the pixel electrode PE of the eleventh pixel structure SPX11, the pixel electrode PE of the twelfth pixel structure SPX12, the pixel electrode PE of the thirteenth pixel structure SPX13, the pixel electrode PE of the fourteenth pixel structure SPX14, the pixel electrode PE of the fifteenth pixel structure SPX15, the pixel electrode PE of the sixteenth pixel structure SPX16, the pixel electrode PE of the seventeenth pixel structure SPX17, the pixel electrode PE of the eighteenth pixel structure SPX18, the pixel electrode PE of the nineteenth pixel structure SPX19, the pixel electrode PE of the twentieth pixel structure SPX20, the pixel electrode PE of the twenty-first pixel structure SPX21, the pixel electrode PE of the twenty-second pixel structure SPX22, the pixel electrode PE of the twenty-third pixel structure SPX23 and the pixel electrode PE of the twenty-fourth pixel structure SPX24 are arranged in sequence in the first direction d1.

In the top view of the pixel array substrate 10, the first pixel structure SPX1, the second pixel structure SPX2, the third pixel structure SPX3, the fourth pixel structure SPX4, the fifth pixel structure SPX5, the sixth pixel structure SPX6, the seventh pixel structure SPX7, the eighth pixel structure SPX8, the ninth pixel structure SPX9, the tenth pixel structure SPX10, the eleventh pixel structure SPX11, the twelfth pixel structure SPX12, the thirteenth pixel structure SPX13, the fourteenth pixel structure SPX14, the fifteenth pixel structure SPX15, the sixteenth pixel structure SPX16, the seventeenth pixel structure SPX17, the eighteenth pixel structure SPX18, the nineteenth pixel structure SPX19, the twentieth pixel structure SPX20, the twenty-first pixel structure SPX21, the twenty-second pixel structure SPX22, the twenty-third pixel structure SPX23 and the twenty-fourth pixel structure SPX24 are located between the m-th scan line GL-m and the (m+1)-th scan line GL-m+1.

In the top view of the pixel array substrate 10, the first pixel structure SPX1 and the second pixel structure SPX2 are located between the n-th data line DL-n and the (n+1)-th data line DL-n+1, the third pixel structure SPX3 and the fourth pixel structure SPX4 are located between the (n+1)-th data line DL-n+1 and the (n+2)-th data line DL-n+2, the fifth pixel structure SPX5 and the sixth pixel structure SPX6 are located between the (n+2)-th data line DL-n+2 and the (n+3)-th data line DL-n+3, the seventh pixel structure SPX7 and the eighth pixel structure SPX8 are located between the (n+3)-th data line DL-n+3 and the (n+4)-th data line DL-n+4, the ninth pixel structure SPX9 and the tenth pixel structure SPX10 are located between the (n+4)-th data line DL-n+4 and the (n+5)-th data line DL-n+5, the eleventh pixel structure SPX11 and the twelfth pixel structure SPX12 are located between the (n+5)-th data line DL-n+5 and the (n+6)-th data line DL-n+6, the thirteenth pixel structure SPX13 and the fourteenth pixel structure SPX14 are located between the (n+6)-th data line DL-n+6 and the (n+7)-th data line DL-n+7, the fifteenth pixel structure SPX15 and the sixteenth pixel structure SPX16 are located between the (n+7)-th data line DL-n+7 and the (n+8)-th data line DL-n+8, the seventeenth pixel structure SPX17 and the eighteenth pixel structure SPX18 are located between the (n+8)-th data line DL-n+8 and the (n+9)-th data line DL-n+9, the nineteenth pixel structure SPX19 and the twentieth pixel structure SPX20 are located between the (n+9)-th data line DL-n+9 and the (n+10)-th data line DL-n+10, the twenty-first pixel structure SPX21 and the twenty-second pixel structure SPX22 are located between the (n+10)-th data line DL-n+10 and the (n+11)-th data line DL-n+11 and the twenty-third pixel structure SPX23 and the twenty-fourth pixel structure SPX24 are located between the (n+11)-th data line DL-n+11 and the (n+12)-th data line DL-n+12.

The control terminal Tc of the transistor T of the first pixel structure SPX1 and the control terminal Tc of the transistor T of the second pixel structure SPX2 are electrically connected to the m-th scan line GL-m and the (m+1)-th scan line GL-m+1 respectively, and the first terminal Ta of the transistor T of the first pixel structure SPX1 and the first terminal Ta of the transistor T of the second pixel structure SPX2 are electrically connected to the (n+1)-th data line DL-n+1.

The control terminal Tc of the transistor T of the third pixel structure SPX3 and the control terminal Tc of the transistor T of the fourth pixel structure SPX4 are electrically connected to the m-th scan line GL-m and the (m+1)-th scan line GL-m+1 respectively, and the first terminal Ta of the transistor T of the third pixel structure SPX3 and the first terminal Ta of the transistor T of the fourth pixel structure SPX4 are electrically connected to the (n+2)-th data line DL-n+2.

The control terminal Tc of the transistor T of the fifth pixel structure SPX5 and the control terminal Tc of the transistor T of the sixth pixel structure SPX6 are electrically connected to the (m+1)-th scan line GL-m+1 and the m-th scan line GL-m respectively, and the first terminal Ta of the transistor T of the fifth pixel structure SPX5 and the first terminal Ta of the transistor T of the sixth pixel structure SPX6 are electrically connected to the (n+3)-th data line DL-n+3.

The control terminal Tc of the transistor T of the seventh pixel structure SPX7 and the control terminal Tc of the transistor T of the eighth pixel structure SPX8 are electrically connected to the (m+1)-th scan line GL-m+1 and the m-th scan line GL-m respectively, and the first terminal Ta of the transistor T of the seventh pixel structure SPX7 and the first terminal Ta of the transistor T of the eighth pixel structure SPX8 are electrically connected to the (n+4)-th data line DL-n+4.

The control terminal Tc of the transistor T of the ninth pixel structure SPX9 and the control terminal Tc of the transistor T of the tenth pixel structure SPX10 are electrically connected to the m-th scan line GL-m and the (m+1)-th scan line GL-m+1 respectively, and the first terminal Ta of the transistor T of the ninth pixel structure SPX9 and the first terminal Ta of the transistor T of the tenth pixel structure SPX10 are electrically connected to the (n+5)-th data line DL-n+5.

The control terminal Tc of the transistor T of the eleventh pixel structure SPX11 and the control terminal Tc of the transistor T of the twelfth pixel structure SPX12 are electrically connected to the (m+1)-th scan line GL-m+1 and the m-th scan line GL-m respectively, and the first terminal Ta of the transistor T of the eleventh pixel structure SPX11 and the first terminal Ta of the transistor T of the twelfth pixel structure SPX12 are electrically connected to the (n+6)-th data line DL-n+6.

The control terminal Tc of the transistor T of the thirteenth pixel structure SPX13 and the control terminal Tc of the transistor T of the fourteenth pixel structure SPX14 are electrically connected to the (m+1)-th scan line GL-m+1 and the m-th scan line GL-m respectively, and the first terminal Ta of the transistor T of the thirteenth pixel structure SPX13 and the first terminal Ta of the transistor T of the fourteenth pixel structure SPX14 are electrically connected to the (n+7)-th data line DL-n+7.

It should be noted that the control terminal Tc of the transistor T of the seventh pixel structure SPX7 and the control terminal Tc of the transistor T of the eighth pixel structure SPX8 are electrically connected to the (m+1)-th scan line GL-m+1 and the m-th scan line GL-m respectively, and the control terminal Tc of the transistor T of the thirteenth pixel structure SPX13 and the control terminal Tc of the transistor T of the fourteenth pixel structure SPX14 are electrically connected to the (m+1) scan line GL-m+1 and the m-th scan line GL-m respectively. That is to say, the connection method of the control terminal Tc of the transistor T of the seventh pixel structure SPX7 and the control terminal Tc of the transistor T of the eighth pixel structure SPX8 electrically connected to the (n+4)-th data line DL-n+4 and the scan lines GL is the same as the connection method of the control terminal Tc of the transistor T of the thirteenth pixel structure SPX13 and the control terminal Tc of the transistor T of the fourteenth pixel structure SPX14 electrically connected to the (n+7)-th data line DL-n+7 and the scan lines GL.

The control terminal Tc of the transistor T of the fifteenth pixel structure SPX15 and the control terminal Tc of the transistor T of the sixteenth pixel structure SPX16 are electrically connected to the m-th scan line GL-m and the (m+1)-th scan line GL-m+1 respectively, and the first terminal Ta of the transistor T of the fifteenth pixel structure SPX15 and the first terminal Ta of the transistor T of the sixteenth pixel structure SPX16 are electrically connected to the (n+8)-th data line DL-n+8.

The control terminal Tc of the transistor T of the seventeenth pixel structure SPX17 and the control terminal Tc of the transistor T of the eighteenth pixel structure SPX18 are electrically connected to the (m+1)-th scan line GL-m+1 and the m-th scan line GL-m respectively, and the first terminal Ta of the transistor T of the seventeenth pixel structure SPX17 and the first terminal Ta of the transistor T of the eighteenth pixel structure SPX18 are electrically connected to the (n+9)-th data line DL-n+9.

The control terminal Tc of the transistor T of the nineteenth pixel structure SPX19 and the control terminal Tc of the transistor T of the twentieth pixel structure SPX20 are electrically connected to the m-th scan line GL-m and the (m+1)-th scan line GL-m+1 respectively, and the first terminal Ta of the transistor T of the nineteenth pixel structure SPX19 and the first terminal Ta of the transistor T of the twentieth pixel structure SPX20 are electrically connected to the (n+10)-th data line DL-n+10.

It should be noted that the control terminal Tc of the transistor T of the first pixel structure SPX1 and the control terminal Tc of the transistor T of the nineteenth pixel structure SPX19 are both electrically connected to the m-th scan line GL-m, and the control terminal Tc of the transistor T of the second pixel structure SPX2 and the control terminal Tc of the transistor T of the twentieth pixel structure SPX20 are both electrically connected to the (m+1)-th scan line GL-m+1. That is to say, the connection method of the control terminal Tc of the transistor T of the first pixel structure SPX1 and the control terminal Tc of the transistor T of the second pixel structure SPX2 electrically connected to the (n+1)-th data line DL-n+1 and the scan lines GL is the same as the connection method of the control terminal Tc of the transistor T of the nineteenth pixel structure SPX19 and the control terminal Tc of the transistor T of the twentieth pixel structure SPX20 electrically connected to the (n+10)-th data line DL-n+10 and the scan lines GL.

The control terminal Tc of the transistor T of the first pixel structure SPX1 and the control terminal Tc of the transistor T of the seventh pixel structure SPX7 are electrically connected to the m-th scan line GL-m and the (m+1)-th scan line GL-m+1 respectively, and the control terminal Tc of the transistor T of the second pixel structure SPX2 and the control terminal Tc of the transistor T of the eighth pixel structure SPX8 are electrically connected to the (m+1)-th scan line GL-m+1 and the m-th scan line GL-m respectively. That is to say, the connection method of the control terminal Tc of the transistor T of the first pixel structure SPX1 and the control terminal Tc of the transistor T of the second pixel structure SPX2 electrically connected to the (n+1)-th data line DL-n+1 and the scan lines GL is opposite to the connection method of the control terminal Tc of the transistor T of the seventh pixel structure SPX7 and the control terminal Tc of the transistor T of the eighth pixel structure SPX8 electrically connected to the (n+4)-th data line DL-n+4 and the scan lines GL.

The control terminal Tc of the transistor T of the twenty-first pixel structure SPX21 and the control terminal Tc of the transistor T of the twenty-second pixel structure SPX22 are electrically connected to the m-th scan line GL-m and the (m+1)-th scan line GL-m+1 respectively, and the first terminal Ta of the transistor T of the twenty-first pixel structure SPX21 and the first terminal Ta of the transistor T of the twenty-second pixel structure SPX22 are electrically connected to the (n+11)-th data line DL-n+11.

The control terminal Tc of the transistor T of the twenty-third pixel structure SPX23 and the control terminal Tc of the transistor T of the twenty-fourth pixel structure SPX24 are electrically connected to the (m+1)-th scan line GL-m+1 and the m-th scan line GL-m respectively, and the first terminal Ta of the transistor T of the twenty-third pixel structure SPX23 and the first terminal Ta of the transistor T of the twenty-fourth pixel structure SPX24 are electrically connected to the (n+12)-th data line DL-n+12.

In the embodiment, the pixel structures SPX further include a twenty-fifth pixel structure SPX25, a twenty-sixth pixel structure SPX26, a twenty-seventh pixel structure SPX27 and a twenty-eighth pixel structure SPX28. In the top view of the pixel array substrate 10, the pixel electrode PE of the twenty-fifth pixel structure SPX25 and the pixel electrode PE of the twenty-sixth pixel structure SPX26 are arranged in sequence in the first direction d1 and are located between the (n+3)-th data line DL-n+3 and the (n+4)-th data line DL-n+4 and between the (m+2)-th scan line GL-m+2 and the (m+3)-th scan line GL-m+3. The first terminal Ta of the transistor T of the twenty-fifth pixel structure SPX25 and the first terminal Ta of the transistor T of the twenty-sixth pixel structure SPX26 are electrically connected to the (n+3)-th data line DL-n+3.

In the top view of the pixel array substrate 10, the pixel electrode PE of the twenty-seventh pixel structure SPX27 and the pixel electrode PE of the twenty-eighth pixel structure SPX28 are arranged in sequence in the first direction d1 and are located between the (n+6)-th data line DL-n+6 and the (n+7)-th data line DL-n+7 and between the (m+2)-th scan line GL-m+2 and the (m+3)-th scan line GL-m+3. The first terminal Ta of the transistor T of the twenty-seventh pixel structure SPX27 and the first terminal Ta of the transistor T of the twenty-eighth pixel structure SPX28 are electrically connected to the (n+6)-th data line DL-n+6.

It should be noted that the control terminal Tc of the transistor T of the twenty-fifth pixel structure SPX25 and the control terminal Tc of the transistor T of the twenty-seventh pixel structure SPX27 are electrically connected to the (m+3)-th scan line GL-m+3, and the control terminal Tc of the transistor T of the twenty-sixth pixel structure SPX26 and the control terminal Tc of the transistor T of the twenty-eighth pixel structure SPX28 are electrically connected to the (m+2)-th scan Line GL-m+2. That is to say, the connection method of the control terminal Tc of the transistor T of the twenty-fifth pixel structure SPX25 and the control terminal Tc of the transistor T of the twenty-sixth pixel structure SPX26 electrically connected to the (n+3)-th data line DL-n+3 and the scan lines GL is the same as the connection method of the control terminal Tc of the transistor T of the twenty-seventh pixel structure SPX27 and the control terminal Tc of the transistor T of the twenty-eighth pixel structure SPX28 electrically connected to the (n+6)-th data line DL-n+6 and the scan lines GL.

In the embodiment, the pixel structures SPX further include a twenty-ninth pixel structure SPX29, a thirtieth pixel structure SPX30, a thirty-first pixel structure SPX31 and a thirty-second pixel structure SPX32. In the top view of the pixel array substrate 10, the pixel electrode PE of the twenty-ninth pixel structure SPX29 and the pixel electrode PE of the thirtieth pixel structure SPX30 are arranged in sequence in the first direction d1 and are located between the n-th data line DL-n and the (n+1)-th data line DL-n+1 and between the (m+2)-th scan line GL-m+2 and the (m+3)-th scan line GL-m+3. The first terminal Ta of the transistor T of the twenty-ninth pixel structure SPX29 and the first terminal Ta of the transistor T of the thirtieth pixel structure SPX30 are electrically connected to the n-th data line DL-n.

In the top view of the pixel array substrate 10, the pixel electrode PE of the thirty-first pixel structure SPX31 and the pixel electrode PE of the thirty-second pixel structure SPX32 are arranged in sequence in the first direction d1 and are located between the (n+9)-th data line DL-n+9 and the (n+10)-th data line DL-n+10 and between the (m+2)-th scan line GL-m+2 and the (m+3)-th scan line GL-m+3. The first terminal Ta of the transistor T of the thirty-first pixel structure SPX31 and the first terminal Ta of the transistor T of the thirty-second pixel structure SPX32 are electrically connected to the (n+9)-th data line DL-n+9.

It should be noted that the control terminal Tc of the transistor T of the twenty-ninth pixel structure SPX29 and the control terminal Tc of the transistor T of the thirty-first pixel structure SPX31 are both electrically connected to the (m+2)-th scan line GL-m+2, and the control terminal Tc of the transistor T of the thirtieth pixel structure SPX30 and the control terminal Tc of the transistor T of the thirty-second pixel structure SPX32 are both electrically connected to the (m+3)-th scan line GL-m+3. That is to say, the connection method of the control terminal Tc of the transistor T of the twenty-ninth pixel structure SPX29 and the control terminal Tc of the transistor T of the thirtieth pixel structure SPX30 electrically connected to the n-th data line DL-n and the scan lines GL is the same as the connection method of the control terminal Tc of the transistor T of the thirty-first pixel structure SPX31 and the control terminal Tc of the transistor T of the thirty-second pixel structure SPX32 electrically connected to the (n+9)-th data line DL-n+9 and the scan lines GL.

In addition, in the embodiment, the control terminal Tc of the transistor T of the twenty-ninth pixel structure SPX29 is electrically connected to the (m+2)-th scan line GL-m+2, and the control terminal Tc of the transistor T of the twenty-fifth pixel structure SPX25 is electrically connected to the (m+3)-th scan line GL-m+3; the control terminal Tc of the transistor T of the thirtieth pixel structure SPX30 is electrically connected to the (m+3)-th scan line GL-m+3, and the control terminal Tc of the transistor T of the twenty-sixth pixel structure SPX26 is electrically connected to the (m+2)-th scan line GL-m+2. That is to say, the connection method of the control terminal Tc of the transistor T of the twenty-ninth pixel structure SPX29 and the control terminal Tc of the transistor T of the thirtieth pixel structure SPX30 electrically connected to the n-th data line DL-n and the scan lines GL is opposite to the connection method of the control terminal Tc of the transistor T of the twenty-fifth pixel structure SPX25 and the control terminal Tc of the transistor T of the twenty-sixth pixel structure SPX26 electrically connected to the (n+3)-th data line DL-n+3 and the scan lines GL.

In the embodiment, the pixel structures SPX further include a thirty-third pixel structure SPX33 and a thirty-fourth pixel structure SPX34. In the top view of the pixel array substrate 10, the thirty-third pixel structure SPX33 and the thirty-fourth pixel structure SPX34 are located between the (n+1)-th data line DL-n+1 and the (n+2)-th data line DL-n+2 and between the (m+2)-th scan line GL-m+2 and the (m+3)-th scan line GL-m+3. The first terminal Ta of the transistor T of the thirty-third pixel structure SPX33 and the first terminal Ta of the transistor T of the thirty-fourth pixel structure SPX34 are electrically connected to the (n+1)-th data line DL-n+1. The control terminal Tc of the transistor T of the thirty-third pixel structure SPX33 and the control terminal Tc of the transistor T of the thirty-fourth pixel structure SPX34 are electrically connected to the (m+2)-th scan line GL-m+2 and the (m+3)-th scan line GL-m+3 respectively.

In the embodiment, the pixel structures SPX further include a thirty-fifth pixel structure SPX35 and a thirty-sixth pixel structure SPX36. In the top view of the pixel array substrate 10, the thirty-fifth pixel structure SPX35 and the thirty-sixth pixel structure SPX36 are located between the (n+2)-th data line DL-n+2 and the (n+3)-th data line DL-n+3 and between the (m+2)-th scan line GL-m+2 and the (m+3)-th scan line GL-m+3. The first terminal Ta of the transistor T of the thirty-fifth pixel structure SPX35 and the first terminal Ta of the transistor T of the thirty-sixth pixel structure SPX36 are electrically connected to the (n+2)-th data line DL-n+2. The control terminal Tc of the transistor T of the thirty-fifth pixel structure SPX35 and the control terminal Tc of the transistor T of the thirty-sixth pixel structure SPX36 are electrically connected to the (m+3)-th scan line GL-m+3 and the (m+2)-th scan line GL-m+2 respectively.

In the embodiment, the pixel structures SPX further include a thirty-seventh pixel structure SPX37 and a thirty-eighth pixel structure SPX38. In the top view of the pixel array substrate 10, the thirty-seventh pixel structure SPX37 and the thirty-eighth pixel structure SPX38 are located between the (n+4)-th data line DL-n+4 and the (n+5)-th data line DL-n+5 and between the (m+2)-th scan line GL-m+2 and the (m+3)-th scan line GL-m+3. The first terminal Ta of the transistor T of the thirty-seventh pixel structure SPX37 and the first terminal Ta of the transistor T of the thirty-eighth pixel structure SPX38 are electrically connected to the (n+4)-th data line DL-n+4. The control terminal Tc of the transistor T of the thirty-seventh pixel structure SPX37 and the control terminal Tc of the transistor T of the thirty-eighth pixel structure SPX38 are electrically connected to the (m+2)-th scan line GL-m+2 and the (m+3)-th scan line GL-m+3 respectively.

In the embodiment, the pixel structures SPX further include a thirty-ninth pixel structure SPX39 and a fortieth pixel structure SPX40. In the top view of the pixel array substrate 10, the thirty-ninth pixel structure SPX39 and the fortieth pixel structure SPX40 are located between the (n+5)-th data line DL-n+5 and the (n+6)-th data line DL-n+6 and between the (m+2)-th scan line GL-m+2 and the (m+3)-th scan line GL-m+3. The first terminal Ta of the transistor T of the thirty-ninth pixel structure SPX39 and the first terminal Ta of the transistor T of the fortieth pixel structure SPX40 are electrically connected to the (n+5)-th data line DL-n+5. The control terminal Tc of the transistor T of the thirty-ninth pixel structure SPX39 and the control terminal Tc of the transistor T of the fortieth pixel structure SPX40 are electrically connected to the (m+3)-th scan line GL-m+3 and the (m+2)-th scan line GL-m+2 respectively.

In the embodiment, the pixel structures SPX further include a forty-first pixel structure SPX41 and a forty-second pixel structure SPX42. In the top view of the pixel array substrate 10, the forty-first pixel structure SPX41 and the forty-second pixel structure SPX42 are located between the (n+7)-th data line DL-n+7 and the (n+8)-th data line DL-n+8 and between the (m+2)-th scan line GL-m+2 and the (m+3)-th scan line GL-m+3. The first terminal Ta of the transistor T of the forty-first pixel structure SPX41 and the first terminal Ta of the transistor T of the forty-second pixel structure SPX42 are electrically connected to the (n+7)-th data line DL-n+7. The control terminal Tc of the transistor T of the forty-first pixel structure SPX41 and the control terminal Tc of the transistor T of the forty-second pixel structure SPX42 are electrically connected to the (m+2)-th scan line GL-m+2 and the (m+3)-th scan line GL-m+3 respectively.

In the embodiment, the pixel structures SPX further include a forty-third pixel structure SPX43 and a forty-fourth pixel structure SPX44. In the top view of the pixel array substrate 10, the forty-third pixel structure SPX43 and the forty-fourth pixel structure SPX44 are located between the (n+8)-th data line DL-n+8 and the (n+9)-th data line DL-n+9 and between the (m+2)-th scan line GL-m+2 and the (m+3)-th scan line GL-m+3. The first terminal Ta of the transistor T of the forty-third pixel structure SPX43 and the first terminal Ta of the transistor T of the forty-fourth pixel structure SPX44 are electrically connected to the (n+8)-th data line DL-n+8. The control terminal Tc of the transistor T of the forty-third pixel structure SPX43 and the control terminal Tc of the transistor T of the forty-fourth pixel structure SPX44 are electrically connected to the (m+3)-th scan line GL-m+3 and the (m+2)-th scan line GL-m+2 respectively.

In the embodiment, the pixel structures SPX further include a forty-fifth pixel structure SPX45 and a forty-sixth pixel structure SPX46. In the top view of the pixel array substrate 10, the forty-fifth pixel structure SPX45 and the forty-sixth pixel structure SPX46 are located between the (n+10)-th data line DL-n+10 and the (n+11)-th data line DL-n+11 and between the (m+2)-th scan line GL-m+2 and the (m+3)-th scan line GL-m+3. The first terminal Ta of the transistor T of the forty-fifth pixel structure SPX45 and the first terminal Ta of the transistor T of the forty-sixth pixel structure SPX46 are electrically connected to the (n+10)-th data line DL-n+10. The control terminal Tc of the transistor T of the forty-fifth pixel structure SPX45 and the control terminal Tc of the transistor T of the forty-sixth pixel structure SPX46 are electrically connected to the (m+2)-th scan line GL-m+2 and the (m+3)-th scan line GL-m+3 respectively.

In the embodiment, the pixel structures SPX further include a forty-seventh pixel structure SPX47 and a forty-eighth pixel structure SPX48. In the top view of the pixel array substrate 10, the forty-seventh pixel structure SPX47 and the forty-eighth pixel structure SPX48 are located between the (n+11)-th data line DL-n+11 and the (n+12)-th data line DL-n+12 and between the (m+2)-th scan line GL-m+2 and the (m+3)-th scan line GL-m+3. The first terminal Ta of the transistor T of the forty-seventh pixel structure SPX47 and the first terminal Ta of the transistor T of the forty-eighth pixel structure SPX48 are electrically connected to the (n+11)-th data line DL-n+11. The control terminal Tc of the transistor T of the forty-seventh pixel structure SPX47 and the control terminal Tc of the transistor T of the forty-eighth pixel structure SPX48 are electrically connected to the (m+3)-th scan line GL-m+3 and the (m+2)-th scan line GL-m+2 respectively.

In the embodiment, the pixel array substrate 10 further includes a common electrode com at least overlapping the pixel electrodes PE of the pixel structures SPX.

The pixel structures SPX and the scan lines GL have a special connection mode. In this way, the display device (not shown) including the pixel array substrate 10 is less likely to have a cross-talk phenomenon when displaying a specific pattern. The following is to be described with examples in conjunction with FIG. 1 to FIG. 7.

Referring to FIG. 1, in the embodiment, the second pixel structure SPX2, the third pixel structure SPX3 and the fourth pixel structure SPX4 are respectively configured to display a first color, a second color and a third color that are different from each other, and the second pixel structure SPX2, the third pixel structure SPX3 and the fourth pixel structure SPX4 form a first pixel PX1; the fifth pixel structure SPX5, the sixth pixel structure SPX6 and the seventh pixel structure SPX7 are respectively configured to display the first color, the second color and the third color that are different from each other, and the fifth pixel structures SPX5, the sixth pixel structure SPX6 and the seventh pixel structure SPX7 form a second pixel PX2; the eighth pixel structure SPX8, the ninth pixel structure SPX9 and the tenth pixel structure SPX10 are respectively configured to display the first color, the second color and the third color that are different from each other, and the eighth pixel structure SPX8, the ninth pixel structure SPX9 and the tenth pixel structure SPX10 form a third pixel PX3; the eleventh pixel structure SPX11, the twelfth pixel structure SPX12 and the thirteenth pixel structure SPX13 are respectively configured to display the first color, the second color and the third color that are different from each other, and the eleventh pixel structure SPX11, the twelfth pixel structure SPX12 and the thirteenth pixel structure SPX13 form a fourth pixel PX4; the fourteenth pixel structure SPX14, the fifteenth pixel structure SPX15 and the sixteenth pixel structure SPX16 are respectively configured to display the first color, the second color and the third color that are different from each other, and the fourteenth pixel structure SPX14, the fifteenth pixel structure SPX15 and the sixteenth pixel structure SPX16 form a fifth pixel PX5; the seventeenth pixel structure SPX17, the eighteenth pixel structure SPX18 and the nineteenth pixel structure SPX19 are respectively configured to display the first color, the second color and the third color that are different from each other, and the seventeenth pixel structure SPX17, the eighteenth pixel structure SPX18 and the nineteenth pixel structure SPX19 form a sixth pixel PX6. In the embodiment, the first color, the second color and the third color are, for example, red, green and blue respectively, but the disclosure is not limited thereto.

In the embodiment, the specific pattern displayed by the display device (not shown) having the pixel array substrate 10 includes, for example, two consecutive dark pixel areas and two bright pixel areas overlapping with the first pixel PX1, the second pixel PX2, the third pixel PX3 and the fourth pixel PX4 respectively. The displayed specific pattern further includes two dark pixel areas overlapping with the fifth pixel PX5 and the sixth pixel PX6 respectively.

Figure 2:
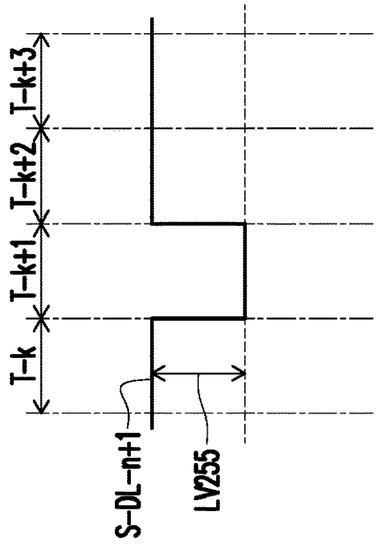
FIG. 2 shows a signal S-DL-n+1 of the (n+1)-th data line DL-n+1 in a frame time of displaying the special pattern according to an embodiment of the disclosure.
Figure 3:
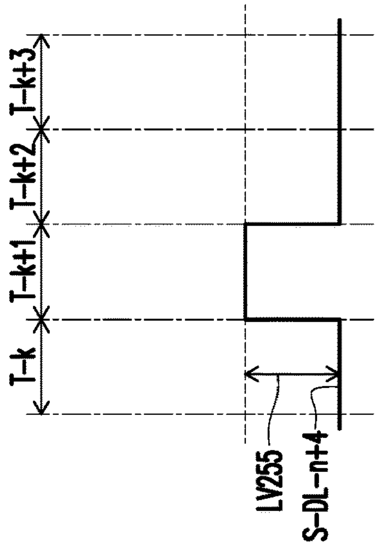
FIG. 3 shows a signal S-DL-n+4 of the (n+4)-th data line DL-n+4 in a frame time of displaying the special pattern according to an embodiment of the disclosure.
Figure 4:
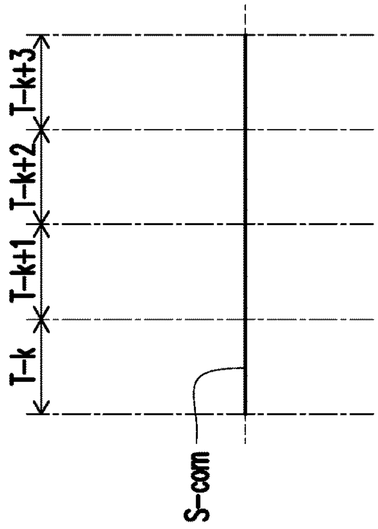
FIG. 4 shows a signal S-com of the common electrode com in a frame time of displaying the special pattern according to an embodiment of the disclosure.

FIG. 2 shows a signal S-DL-n+1 of the (n+1)-th data line DL-n+1 in a frame time of displaying the special pattern according to an embodiment of the disclosure. FIG. 3 shows a signal S-DL-n+4 of the (n+4)-th data line DL-n+4 in a frame time of displaying the special pattern according to an embodiment of the disclosure. FIG. 4 shows a signal S-com of the common electrode com in a frame time of displaying the special pattern according to an embodiment of the disclosure.

Referring to FIG. 1, FIG. 2, FIG. 3 and FIG. 4, the m-th scan line GL-m, the (m+1)-th scan line GL-m+1, the (m+2)-th scan line GL-m+2 and the (m+3)-th scan line GL-m+3 are respectively at a k-th timing T-k, a (k+1)-th timing T-k+1 following the k-th timing T-k, a (k+2)-th timing T-k+2 following the (k+1)-th timing T-k+1 and a (k+3)-th timing T-k+3 following the (k+2)-th timing T-k+2 have a gate opening signal (not shown) that enables the corresponding transistor T to be turned on, and k is a positive integer.

In the k-th timing T-k, the signal S-DL-n+1 of the (n+1)-th data line DL-n+1 has an amplitude LV255 and the second polarity (e.g., positive polarity), and the signal S-DL-n+4 of the (n+4)-th data line DL-n+4 has the same amplitude LV255 and the opposite first polarity (e.g., negative polarity). In the k-th timing T-k, the coupling effect of the signal S-DL-n+1 with the second polarity and the common electrode com may cancel the coupling effect of the signal S-DL-n+4 with the first polarity and the common electrode com, so that the signal S-com of the common electrode com is not easy to fluctuate excessively due to the coupling effect, thereby improving the problem of cross talk that easily occurs when the special pattern is displayed.

Figure 5:
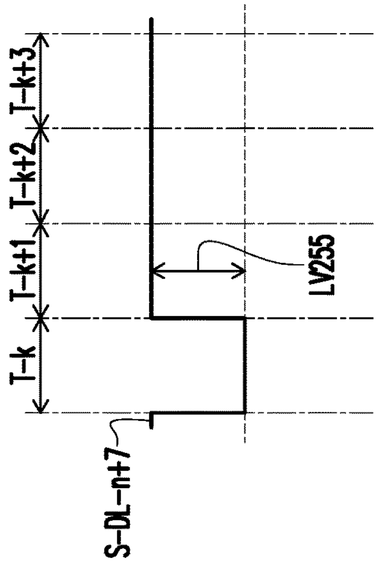
FIG. 5 shows a signal S-DL-n+7 of the (n+7)-th data line DL-n+7 in a frame time of displaying the special pattern according to an embodiment of the disclosure.
Figure 6:
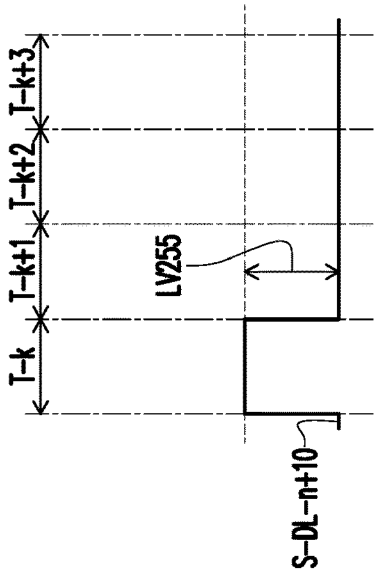
FIG. 6 shows a signal S-DL-n+10 of the (n+10)-th data line DL-n+10 in a frame time of displaying the special pattern according to an embodiment of the disclosure.
Figure 7:
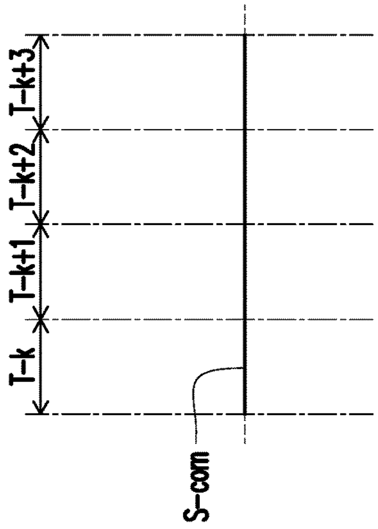
FIG. 7 shows a signal S-com of the common electrode com in a frame time of displaying the special pattern according to an embodiment of the disclosure.

FIG. 5 shows a signal S-DL-n+7 of the (n+7)-th data line DL-n+7 in a frame time of displaying the special pattern according to an embodiment of the disclosure. FIG. 6 shows a signal S-DL-n+10 of the (n+10)-th data line DL-n+10 in a frame time of displaying the special pattern according to an embodiment of the disclosure. FIG. 7 shows a signal S-com of the common electrode com in a frame time of displaying the special pattern according to an embodiment of the disclosure.

Referring to FIG. 1, FIG. 5, FIG. 6 and FIG. 7, in the (k+1)-th timing T-k+1, the (k+2)-th timing T-k+2 and the (k+3)-th timing T-k+3, the signal S-DL-n+7 of the (n+7)-th data line DL-n+7 has the amplitude LV255 and the second polarity (e.g., positive polarity), and the signal S-DL-n+10 of the (n+10)-th data line DL-n+10 has the same amplitude LV255 and the opposite first polarity (e.g., negative polarity). In the (k+1)-th timing T-k+1, the (k+2)-th timing T-k+2 and the (k+3)-th timing T-k+3, the coupling effect of the signal S-DL-n+7 with the second polarity and the common electrode com may cancel the coupling effect of the signal S-DL-n+10 with the first polarity and the common electrode com, so that the signal S-com of the common electrode com is not easy to fluctuate excessively due to the coupling effect, thereby improving the problem of cross talk that easily occurs when the special pattern is displayed.

It should be noted that the special pattern is described as an example of a pattern including two consecutive dark pixel areas and two bright pixel areas commonly found in Excel tables. However, the disclosure is not limited thereto, and the pixel array substrate 10 having a special connection mode between the pixel structures SPX and the scan lines GL may also improve the cross-talk problem that easily occurs when other special patterns are displayed. For example, other special patterns such as a pattern including one dark pixel area and one bright pixel area commonly found in Excel tables or a pattern including five dark pixel areas and one bright pixel area commonly found in Excel tables, but the disclosure is not limited thereto.

It must be noted here that the following embodiments use the element numerals and part of the contents of the foregoing embodiments, the same numerals are used to denote the same or similar elements, and the description of the same technical content is omitted. For the description of the omitted parts, reference may be made to the foregoing embodiments, and thus the description is not repeated in the following embodiments.

Figure 8:
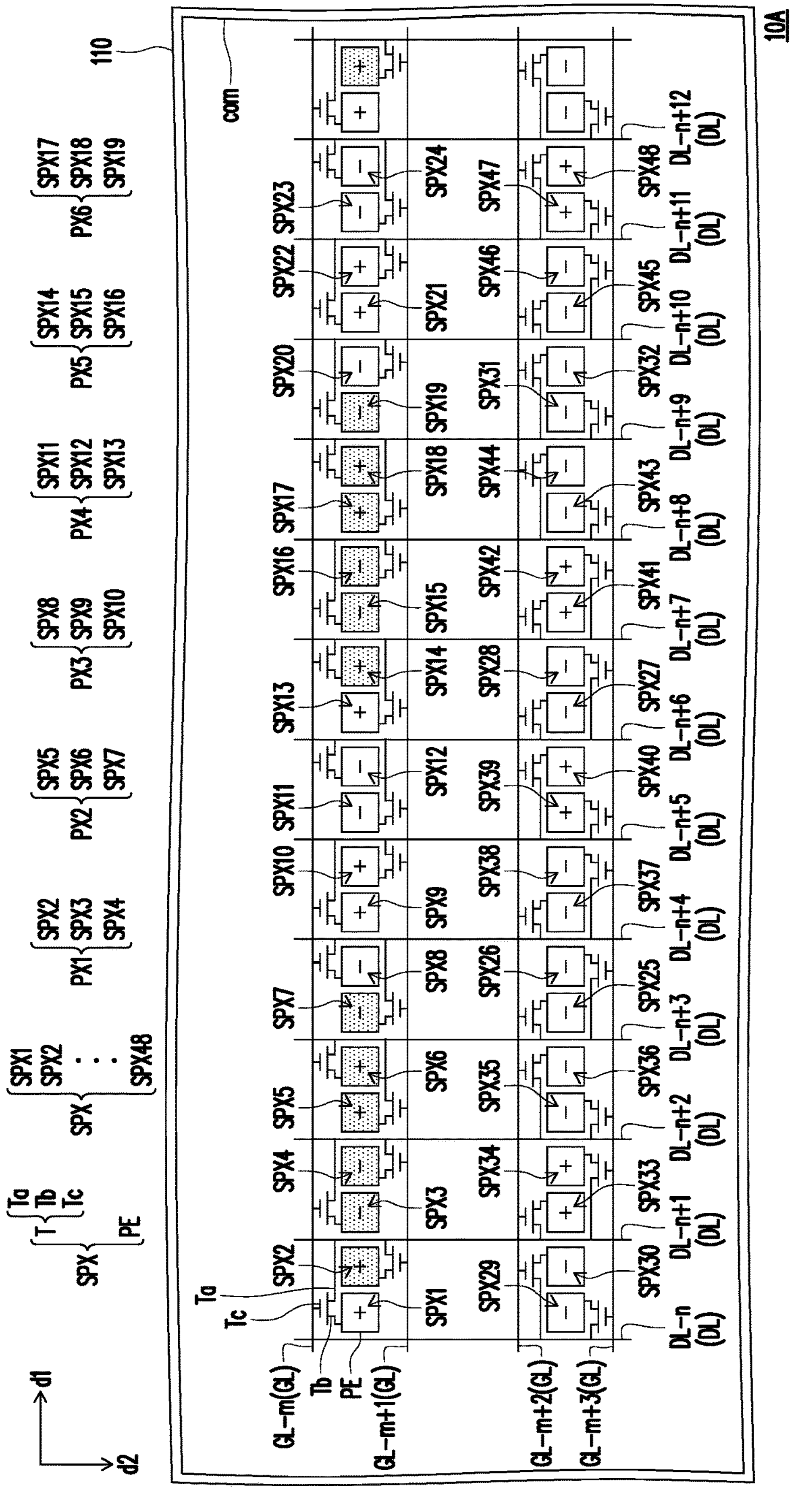
FIG. 8 is a schematic top view of a pixel array substrate 10A according to another embodiment of the disclosure.

FIG. 8 is a schematic top view of a pixel array substrate 10A according to another embodiment of the disclosure.

The pixel array substrate 10A in FIG. 8 is similar to the pixel array substrate 10 in FIG. 1, and several differences between the two are as follows. Referring to FIG. 8, in the embodiment, the control terminal Tc of the transistor T of the twenty-ninth pixel structure SPX29 and the control terminal Tc of the transistor T of the thirty-first pixel structure SPX31 are electrically connected to the (m+3)-th scan line GL-m+3, and the control terminal Tc of the transistor T of the thirtieth pixel structure SPX30 and the control terminal Tc of the transistor T of the thirty-second pixel structure SPX32 are electrically connected to the (m+2)-th scan line GL-m+2. The control terminal Tc of the transistor T of the twenty-ninth pixel structure SPX29 is electrically connected to the (m+3)-th scan line GL-m+3, and the control terminal Tc of the transistor T of the twenty-fifth pixel structure SPX25 is electrically connected to the (m+2)-th scan line GL-m+2; the control terminal Tc of the transistor T of the thirtieth pixel structure SPX30 is electrically connected to the (m+2)-th scan line GL-m+2, and the control terminal Tc of the transistor T of the twenty-sixth pixel structure SPX26 is electrically connected to the (m+3)-th scan line GL-m+3.

Similar to the pixel array substrate 10 in FIG. 1, the pixel array substrate 10A in FIG. 8 may also improve the problem of cross talk when special patterns are displayed.

What is claimed is:

1. A pixel array substrate, comprising:

a plurality of data lines, arranged in a first direction;

a plurality of scan lines, arranged in a second direction, wherein the first direction intersects with the second direction; and a plurality of pixel structures, wherein each of the pixel structures comprises a transistor and a pixel electrode, the transistor has a first terminal, a second terminal and a control terminal, the first terminal of the transistor is electrically connected to one of the data lines, the control terminal of the transistor is electrically connected to one of the scan lines and the second terminal of the transistor is electrically connected to the pixel electrode;

the data lines comprising an n-th data line, an (n+1)-th data line, an (n+2)-th data line, an (n+3)-th data line, an (n+4)-th data line, an (n+5)-th data line, an (n+6)-th data line, an (n+7)-th data line, an (n+8)-th data line, an (n+9)-th data line, an (n+10)-th data line, an (n+11)-th data line and an (n+12)-th data line arranged in sequence in the first direction, wherein n is a positive integer, the n-th data line, the (n+2)-th data line, the (n+4)-th data line, the (n+6)-th data line, the (n+8)-th data line, the (n+10)-th data line and the (n+12)-th data line have first polarity, the (n+1)-th data line, the (n+3)-th data line, the (n+5)-th data line, the (n+7)-th data line, the (n+9)-th data line and the (n+11)-th data line have second polarity, and the first polarity is opposite to the second polarity;

the scan lines comprising an m-th scan line and an (m+1)-th scan line arranged in sequence in the second direction, wherein m is a positive integer;

the pixel structures comprising a first pixel structure, a second pixel structure, a third pixel structure, a fourth pixel structure, a fifth pixel structure, a sixth pixel structure, a seventh pixel structure, an eighth pixel structure, a ninth pixel structure, a tenth pixel structure, an eleventh pixel structure, a twelfth pixel structure, a thirteenth pixel structure, a fourteenth pixel structure, a fifteenth pixel structure, a sixteenth pixel structure, a seventeenth pixel structure, an eighteenth pixel structure, a nineteenth pixel structure, a twentieth pixel structure, a twenty-first pixel structure, a twenty-second pixel structure, a twenty-third pixel structure and a twenty-fourth pixel structure, wherein the pixel electrode of the first pixel structure, the pixel electrode of the second pixel structure, the pixel electrode of the third pixel structure, the pixel electrode of the fourth pixel structure, the pixel electrode of the fifth pixel structure, the pixel electrode of the sixth pixel structure, the pixel electrode of the seventh pixel structure, the pixel electrode of the eighth pixel structure, the pixel electrode of the ninth pixel structure, the pixel electrode of the tenth pixel structure, the pixel electrode of the eleventh pixel structure, the pixel electrode of the twelfth pixel structure, the pixel electrode of the thirteenth pixel structure, the pixel electrode of the fourteenth pixel structure, the pixel electrode of the fifteenth pixel structure, the pixel electrode of the sixteenth pixel structure, the pixel electrode of the seventeenth pixel structure, the pixel electrode of the eighteenth pixel structure, the pixel electrode of the nineteenth pixel structure, the pixel electrode of the twentieth pixel structure, the pixel electrode of the twenty-first pixel structure, the pixel electrode of the twenty-second pixel structure, the pixel electrode of the twenty-third pixel structure and the pixel electrode of the twenty-fourth pixel structure are arranged in sequence in the first direction;

in a top view of the pixel array substrate, the first pixel structure, the second pixel structure, the third pixel structure, the fourth pixel structure, the fifth pixel structure, the sixth pixel structure, the seventh pixel structure, the eighth pixel structure, the ninth pixel structure, the tenth pixel structure, the eleventh pixel structure, the twelfth pixel structure, the thirteenth pixel structure, the fourteenth pixel structure, the fifteenth pixel structure, the sixteenth pixel structure, the seventeenth pixel structure, the eighteenth pixel structure, the nineteenth pixel structure, the twentieth pixel structure, the twenty-first pixel structure, the twenty-second pixel structure, the twenty-third pixel structure and the twenty-fourth pixel structure being located between the m-th scan line and the (m+1)-th scan line;

in the top view of the pixel array substrate, the first pixel structure and the second pixel structure being located between the n-th data line and the (n+1)-th data line, the third pixel structure and the fourth pixel structure being located between the (n+1)-th data line and the (n+2)-th data line, the fifth pixel structure and the sixth pixel structure being located between the (n+2)-th data line and the (n+3)-th data line, the seventh pixel structure and the eighth pixel structure being located between the (n+3)-th data line and the (n+4)-th data line, the ninth pixel structure and the tenth pixel structure being located between the (n+4)-th data line and the (n+5)-th data line, the eleventh pixel structure and the twelfth pixel structure being located between the (n+5)-th data line and the (n+6)-th data line, the thirteenth pixel structure and the fourteenth pixel structure being located between the (n+6)-th data line and the (n+7)-th data line, the fifteenth pixel structure and the sixteenth pixel structure being located between the (n+7)-th data line and the (n+8)-th data line, the seventeenth pixel structure and the eighteenth pixel structure being located between the (n+8)-th data line and the (n+9)-th data line, the nineteenth pixel structure and the twentieth pixel structure being located between the (n+9)-th data line and the (n+10)-th data line, the twenty-first pixel structure and the twenty-second pixel structure being located between the (n+10)-th data line and the (n+11)-th data line and the twenty-third pixel structure and the twenty-fourth pixel structure being located between the (n+11)-th data line and the (n+12)-th data line;

the control terminal of the transistor of the first pixel structure and the control terminal of the transistor of the second pixel structure being electrically connected to the m-th scan line and the (m+1)-th scan line respectively, and the first terminal of the transistor of the first pixel structure and the first terminal of the transistor of the second pixel structure being electrically connected to the (n+1)-th data line;

the control terminal of the transistor of the third pixel structure and the control terminal of the transistor of the fourth pixel structure being electrically connected to the m-th scan line and the (m+1)-th scan line respectively, and the first terminal of the transistor of the third pixel structure and the first terminal of the transistor of the fourth pixel structure being electrically connected to the (n+2)-th data line;

the control terminal of the transistor of the fifth pixel structure and the control terminal of the transistor of the sixth pixel structure being electrically connected to the (m+1)-th scan line and the m-th scan line respectively, and the first terminal of the transistor of the fifth pixel structure and the first terminal of the transistor of the sixth pixel structure being electrically connected to the (n+3)-th data line;

the control terminal of the transistor of the seventh pixel structure and the control terminal of the transistor of the eighth pixel structure being electrically connected to the (m+1)-th scan line and the m-th scan line respectively, and the first terminal of the transistor of the seventh pixel structure and the first terminal of the transistor of the eighth pixel structure being electrically connected to the (n+4)-th data line;

the control terminal of the transistor of the ninth pixel structure and the control terminal of the transistor of the tenth pixel structure being electrically connected to the m-th scan line and the (m+1)-th scan line respectively, and the first terminal of the transistor of the ninth pixel structure and the first terminal of the transistor of the tenth pixel structure being electrically connected to the (n+5)-th data line;

the control terminal of the transistor of the eleventh pixel structure and the control terminal of the transistor of the twelfth pixel structure being electrically connected to the (m+1)-th scan line and the m-th scan line respectively, and the first terminal of the transistor of the eleventh pixel structure and the first terminal of the transistor of the twelfth pixel structure being electrically connected to the (n+6)-th data line;

the control terminal of the transistor of the thirteenth pixel structure and the control terminal of the transistor of the fourteenth pixel structure being electrically connected to the (m+1)-th scan line and the m-th scan line respectively, and the first terminal of the transistor of the thirteenth pixel structure and the first terminal of the transistor of the fourteenth pixel structure being electrically connected to the (n+7)-th data line;

the control terminal of the transistor of the fifteenth pixel structure and the control terminal of the transistor of the sixteenth pixel structure being electrically connected to the m-th scan line and the (m+1)-th scan line respectively, and the first terminal of the transistor of the fifteenth pixel structure and the first terminal of the transistor of the sixteenth pixel structure being electrically connected to the (n+8)-th data line;

the control terminal of the transistor of the seventeenth pixel structure and the control terminal of the transistor of the eighteenth pixel structure being electrically connected to the (m+1)-th scan line and the m-th scan line respectively, and the first terminal of the transistor of the seventeenth pixel structure and the first terminal of the transistor of the eighteenth pixel structure being electrically connected to the (n+9)-th data line;

the control terminal of the transistor of the nineteenth pixel structure and the control terminal of the transistor of the twentieth pixel structure being electrically connected to the m-th scan line and the (m+1)-th scan line respectively, and the first terminal of the transistor of the nineteenth pixel structure and the first terminal of the transistor of the twentieth pixel structure being electrically connected to the (n+10)-th data line;

the control terminal of the transistor of the twenty-first pixel structure and the control terminal of the transistor of the twenty-second pixel structure being electrically connected to the m-th scan line and the (m+1)-th scan line respectively, and the first terminal of the transistor of the twenty-first pixel structure and the first terminal of the transistor of the twenty-second pixel structure being electrically connected to the (n+11)-th data line;

the control terminal of the transistor of the twenty-third pixel structure and the control terminal of the transistor of the twenty-fourth pixel structure being electrically connected to the (m+1)-th scan line and the m-th scan line respectively, and the first terminal of the transistor of the twenty-third pixel structure and the first terminal of the transistor of the twenty-fourth pixel structure being electrically connected to the (n+12)-th data line;

wherein the scan lines further comprise an (m+2)-th scan line and an (m+3)-th scan line; the m-th scan line, the (m+1)-th scan line, the (m+2)-th scan line and the (m+3)-th scan line are arranged in sequence in the second direction; the pixel structures further comprise a twenty-fifth pixel structure, a twenty-sixth pixel structure, a twenty-seventh pixel structure and a twenty-eighth pixel structure; in the top view of the pixel array substrate, the pixel electrode of the twenty-fifth pixel structure and the pixel electrode of the twenty-sixth pixel structure are arranged in sequence in the first direction and are located between the (n+3)-th data line and the (n+4)-th data line and between the (m+2)-th scan line and the (m+3)-th scan line; the first terminal of the transistor of the twenty-fifth pixel structure and the first terminal of the transistor of the twenty-sixth pixel structure are electrically connected to the (n+3)-th data line; in the top view of the pixel array substrate, the pixel electrode of the twenty-seventh pixel structure and the pixel electrode of the twenty-eighth pixel structure are arranged in sequence in the first direction and are located between the (n+6)-th data line and the (n+7)-th data line and between the (m+2)-th scan line and the (m+3)-th scan line; the first terminal of the transistor of the twenty-seventh pixel structure and the first terminal of the transistor of the twenty-eighth pixel structure are electrically connected to the (n+6)-th data line; the control terminal of the transistor of the twenty-fifth pixel structure and the control terminal of the transistor of the twenty-seventh pixel structure are electrically connected to the (m+3)-th scan line, and the control terminal of the transistor of the twenty-sixth pixel structure and the control terminal of the transistor of the twenty-eighth pixel structure are electrically connected to the (m+2)-th scan line.

2. The pixel array substrate according to claim 1, wherein the pixel structures further comprise a twenty-ninth pixel structure, a thirtieth pixel structure, a thirty-first pixel structure and a thirty-second pixel structure; in the top view of the pixel array substrate, the pixel electrode of the twenty-ninth pixel structure and the pixel electrode of the thirtieth pixel structure are arranged in sequence in the first direction and are located between the n-th data line and the (n+1)-th data line and between the (m+2)-th scan line and the (m+3)-th scan line; the first terminal of the transistor of the twenty-ninth pixel structure and the first terminal of the transistor of the thirtieth pixel structure are electrically connected to the n-th data line; in the top view of the pixel array substrate, the pixel electrode of the thirty-first pixel structure and the pixel electrode of the thirty-second pixel structure are arranged in sequence in the first direction and are located between the (n+9)-th data line and the (n+10)-th data line and between the (m+2)-th scan line and the (m+3)-th scan line; the first terminal of the transistor of the thirty-first pixel structure and the first terminal of the transistor of the thirty-second pixel structure are electrically connected to the (n+9)-th data line; the control terminal of the transistor of the twenty-ninth pixel structure and the control terminal of the transistor of the thirty-first pixel structure are electrically connected to the (m+2)-th scan line, and the control terminal of the transistor of the thirtieth pixel structure and the control terminal of the transistor of the thirty-second pixel structure are electrically connected to the (m+3)-th scan line.

3. The pixel array substrate according to claim 1, wherein the pixel structures further comprise a twenty-ninth pixel structure, a thirtieth pixel structure, a thirty-first pixel structure and a thirty-second pixel structure; in the top view of the pixel array substrate, the pixel electrode of the twenty-ninth pixel structure and the pixel electrode of the thirtieth pixel structure are arranged in sequence in the first direction and are located between the n-th data line and the (n+1)-th data line and between the (m+2)-th scan line and the (m+3)-th scan line; the first terminal of the transistor of the twenty-ninth pixel structure and the first terminal of the transistor of the thirtieth pixel structure are electrically connected to the n-th data line; in the top view of the pixel array substrate, the pixel electrode of the thirty-first pixel structure and the pixel electrode of the thirty-second pixel structure are arranged in sequence in the first direction and are located between the (n+9)-th data line and the (n+10)-th data line and between the (m+2)-th scan line and the (m+3)-th scan line; the first terminal of the transistor of the thirty-first pixel structure and the first terminal of the transistor of the thirty-second pixel structure are electrically connected to the (n+9)-th data line; the control terminal of the transistor of the twenty-ninth pixel structure and the control terminal of the transistor of the thirty-first pixel structure are electrically connected to the (m+3)-th scan line, and the control terminal of the transistor of the thirtieth pixel structure and the control terminal of the transistor of the thirty-second pixel structure are electrically connected to the (m+2)-th scan line.

* * * * *